Aug. 12, 1930.    M. C. ROSENBLATT    1,772,594
THRESHOLD CLOSURE
Filed June 9, 1928
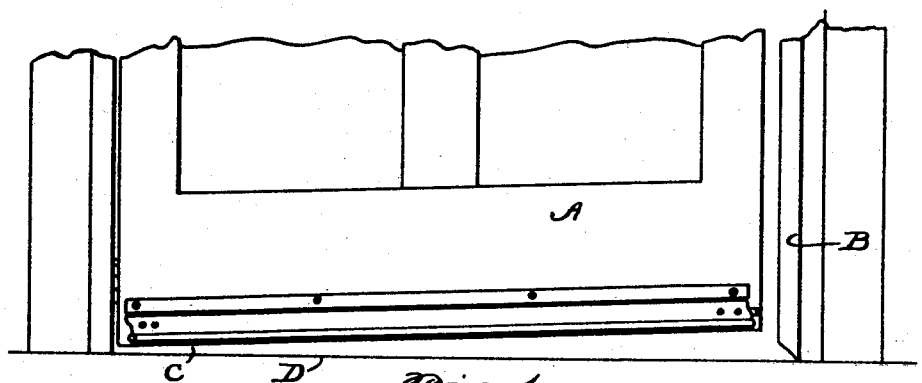
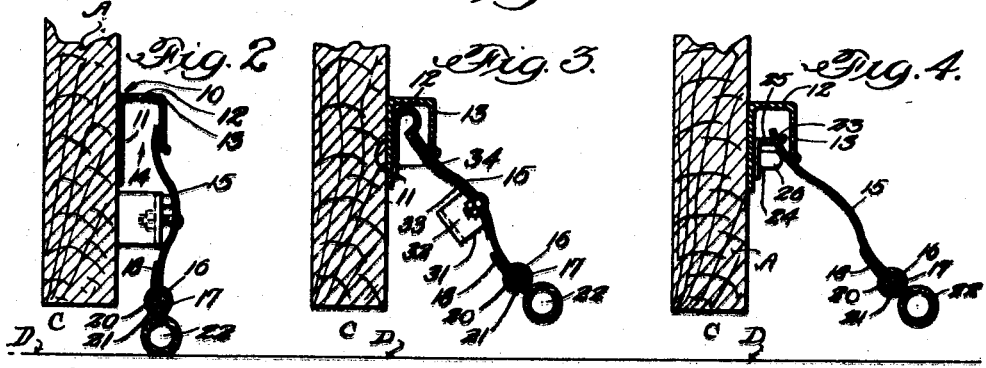
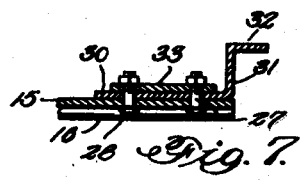
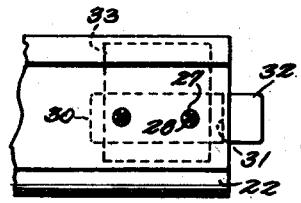
Inventor
Maurice C. Rosenblatt
By Frank H. Boiden
Attorney Patented Aug. 12, 1930

1,772,594

UNITED STATES PATENT OFFICE

MAURICE C. ROSENBLATT, OF PHILADELPHIA, PENNSYLVANIA

THRESHOLD CLOSURE

Application filed June 9, 1928. Serial No. 284,150.

This invention relates to threshold closures, and more particularly to pivoted devices attached to doors for closing the opening existing between the lower edge of the door and the threshold thereof.

Among the objects of the invention are: to provide a threshold closure pivotally associated with a door, with means protecting and covering the joint between the closure and such door; to provide a threshold closure arranged for movable association with a door, with means engageable by the normal door stop for effecting movement of the closure, said means simultaneously functioning as an anti-rattler for the door; to improve generally the construction of threshold closures; to provide a threshold closure of neat and ornamental appearance with efficient functioning at an economical manufacturing cost; to provide improved means for pivotally associating threshold closures with doors; to provide a spring elevated threshold closure that will not warp or twist under stresses; to provide in threshold closures elements and portions subject to quick and easy removal and replacement without affecting the main parts thereof as they may wear under prolonged use; to provide a threshold closure with interchangeable parts such that a closure as provided may be attached to a door and rendered operable regardless of the location of the hinges of the door; to provide a threshold closure which is adjustable to accord with variations in the size of doors to which it may be attached; to provide a threshold closure for pivotal association with a door with means for raising and lowering the closure on its pivot, the means each being operable on substantially the same point on the closure so that twisting and warping stresses are minimized; and many other objects and advantages as will be more apparent as the description proceeds.

In carrying out the invention in a preferred form, a supporting housing is provided of substantially inverted U shape for attachment to the door, to one leg of which a closure strip is pivotally attached in such manner that the strip is caused to abut the other leg of the support as the strip is swung on its pivot in order to effect a substantially tight joint at the upper portion of the closure strip while the lower edge abuts the floor or threshold, the closure strip having toward one end a laterally extending clip or stop arranged to engage the normal door stop fastened removably to the strip, the connecting means also serving to connect a spring element to the strip frictionally engaging the leg of the support to which the strip is pivoted, the spring arranged to elevate the strip on its pivot, and being directly engaged and compressed by stress on the lateral clip or stop, with minimization of the warping or twisting action that otherwise might be exerted on the strip. This preferred form also possesses other features and advantages, and may be modified in part as explained herein.

In the accompanying drawings, forming part of this description:

Fig. 1 represents a perspective of a door and doorway with a threshold closure according to this invention affixed to the door, but shown in elevated position as it normally is maintained except when the door is actually closed.

Fig. 2 represents a fragmentary end elevation of a door with a threshold closure in closed position relative the door and the floor.

Fig. 3 represents a fragmentary end elevation of the same partially in section illustrating the disposition of the spring device and the position of the closure in its open position.

Fig. 4 represents a fragmentary elevation, partially in section of a door and attached threshold closure, illustrating the preferred form of hinge connection between the parts.

Fig. 5 represents an elevation of a modified form of threshold closure according to this invention, wherein adjustment as to length is provided for.

Fig. 6 represents a fragmentary elevation of the end of the threshold closure, showing in dotted lines the disposition of the spring device and the laterally extending door stop engaged clip.

Fig. 7 represents a fragmentary horizontal section through the structure shown in Fig. 6, and Fig. 8 represents a vertical section through the modified form of closure shown in Fig. 5.

The invention is applicable in general to a door A, swinging in a doorway having a stop B, and is to correct or close the gap or threshold opening C usually existing between the lower edge of the door, and the floor or threshold D. It is well known, of course, that such threshold openings permit the admission of drafts of cold air, dust, dirt and sounds. While effecting a closure for the opening in the closed position of the door, it is of importance that the closing device be susceptible to elevation out of the path below the lower edge of the door, in order to avoid rugs, and the like, which are usually located within the radius of swing of the door, as well as to preclude frictional engagement between the closure and the floor such as might militate against the free use of the door.

It has been found in earlier inventions seeking in part the ideals achieved herein, that the attachment of a pivoted strip to a door, when the strip is made of stamped metal, frequently effects a gap between the upper edge of the strip and the door which is undesirable.

In order to guard against such gap or crack between the strip or closure and the door, and to prevent the ingress of water and dust behind the closure, as well as to provide a simple form of attachment whereby the closure may be easily and quickly positioned, the closure is provided with an upper supporting housing or water table 10, comprising an inverted trough arranged to extend across the width of the door, substantially, and having an inner longer leg 11 arranged to abut the door A, a horizontally projected section 12, and an outer short leg 13, substantially parallel with the inner leg but having a space 14 between the legs due to the width of section 12. This trough is preferably stamped or punched from a single sheet of material, such as sheet metal, although obviously it may be modified in many ways.

The closure element comprises an elongated strip 15, preferably having a curved surface vertically between the upper and lower limits of the strip, to impart an ornamental appearance and, of more importance to stiffen and reinforce the strip throughout its length. The lower end of the strip is struck out as at 16 to form one half of a cushion engaging slot or pocket 17, the other half of which may be formed of a supplemental strip 18, oppositely struck out, as at 20, and welded, or otherwise secured to the outer main strip 15. Removably received in the socket or pocket 17, is the upper element 21, of the cushion 22, preferably formed of rubber, but clearly susceptible to many forms and materials, or combinations thereof. The cushion and the cooperating pocket are so arranged that the cushion may be slid endwise into the pocket, from the side edge of the strip, and clearly, as it wears with use, may be removed and replaced in the same manner without disturbing the assembly on the door A.

In order to pivotally associate the strip or closure element 15 with the water table or supporting housing, ordinary hinge members may be fastened to both parts (not shown), as will be obvious. It is preferred, however, in the interests of economy, to provide at desired points in the strip 15, horizontal slots 23. To the inner leg 11 of the trough or water table flanged plates 24 may be affixed, carrying on their front faces tongues 25 arranged for registration with the slots 23, respectively, and lugs or ears 26 extending perpendicularly from the face of the plate 24 substantially in the plane of, or just below the tongue 25, (all as shown in Fig. 4). In this connection it will be seen that both the lugs and the tongues may be struck from the metal of the inner leg 11 of the trough or supporting housing and obviate the separate plate disclosed.

It will be observed that by providing appropriate openings in the parts 11 and 13 of the supporting housing, the housing may be rigidly affixed to the door A, and that in this position the closure element may be swung about an axis located in the space 14 between the legs of the housing on its pivots. In such oscillation of the closure element, in the position shown in Fig. 4, there is substantial engagement between the upper portion of strip 15 and the lower edge of the front or outer leg 13 of the support, although a tight fit between the parts in this position is not essential other than to preserve the unity of appearance. When swung to the position shown in Fig. 2, for instance and however, it will be clear that the lugs 26 are in the path of the inner surface of the strip, just below its axis, so as to force the upper edge of the strip 15 into abutting position relative the inner surface of the outer leg 13, thus maintaining a tight engagement at the top when the door is closed and the closure abutting the floor or threshold.

In order to operate the closure a laterally extending clip is provided so positioned as to abut the normal door stop B, but of such thinness as to interfere in no way with the proper closing of the door. It will be understood that according to the location of the hinges on door A, whether on the right or left hand so must the laterally extending clip be extended. To provide for the alternative positioning of the clip or stop, the closure element 15 is provided toward each end with a pair of horizontally aligned medianly spaced openings 27. By connecting bolts and nuts 28 extended through the openings they may be sealed at one end, and at the other (of the strip), they may be used to rigidly attach and anchor the inner end of a clip or stop lug 30, which may be formed of resilient material and have one end project beyond the edge of the strip in position to abut the door stop B. If such resilient material is used and the clip is initially in a plane, it will be observed that the clip will be subjected to bending stresses when the door is closed, owing to the distance that the closure strip is spaced from the plane of the door face, as shown in Fig. 2. This form of clip is quite feasible and has been used with success, as it serves the useful supplemental purpose of maintaining the lower edge of the door A under tension and prevents rattles and vibrations under the influence of air currents and the like.

It is preferred however, to provide a stepped clip as shown in Fig. 7, wherein the inner end 30 is attached to the concave surface of the strip 15, is bent perpendicularly as at 31, and terminates in a lug or stop 32 parallel with but spaced from the inner end 30. The arrangement is preferably such that when the closure is in the closed position as shown in Fig. 2, the lug end or stop 32 is in juxtaposition to the face of the door A, in the plane of the inner leg of the housing. This feature facilitates the use of stamped metal.

In order to elevate the closure on its axis or pivot whenever the door is opened a novel spring arrangement is provided. The spring element 33 has one end bent to conform with the inner surface of the strip or closure 15, substantially, as shown in Figs. 3 and 7, and is apertured to be connected by bolts 28 either between the stop lug and the strip 15, or the nuts associated with bolts 28 and the stop lug. At any rate it is preferred that the point of attachment of the spring 33 be in registry with the point of attachment of the stop lug or clip, such that the stress imparted to the strip or closure by either the spring or the clip is directly opposed by the other, respectively, and the twisting and warping action that arises from applying the two stresses at longitudinally spaced points is avoided. The spring 33 has a resilient leg 34 arranged to bear frictionally against the inner leg 11 of the supporting housing. If desired anti-friction material may be interposed between the legs 33 and 11, as by means of a graphited tape (not shown) or other device. It will be apparent that the spring device 33 may be inserted laterally into position between the parts, and thus may be removed and replaced without disassembly of the entire structure. Obviously the same is true of the clip or stop lug 30.

It is contemplated that the closures may be provided in varying lengths to accord with the standard widths of doors and that by means of a hack saw or other device the undesired extra length of the closure may be removed to enable a good fit between the door stops of the doorway. This is an economical and practicable manner of attachment, well within the range of skill of the average householder. In order to obviate this feature in instances where it may be undesirable, it is contemplated that the adjustable feature disclosed in Figs. 5 and 8 may be utilized.

As shown in Fig. 5, the closure is of the same general and special construction as that already disclosed, except that toward the ends of the strip and housing ornamental irregular lines, that is, preferably curved lines, as 35 are struck up or otherwise formed in the external surfaces of the parts. These have no mechanical function but serve solely to impart an ornamental appearance which balances similar configurations formed toward the center as an incident of the adjustability to be described.

The supporting housing is substantially identical with that already described, preferably, in the outer adjustable portions of the closure, as at 36, but may have slots 37 formed in the horizontal portion 38 in which a reduced inner leg 40 of a housing shell 41 is received. The housing shell lies over the inner spaced ends of the main supporting housing sections 36 to cover the gap that may exist therebetween when they are moved endwise apart in securing the proper length of the closure. The spaced ends of the housing are indicated in dotted lines by 42 in Fig. 5. The outer portions of the strip or closure which is formed in two parts, as 43, have slots 44 formed horizontally toward their meeting ends which are normally covered by the closure shell 45 covering the faces of the strips and rigidly and adjustably connected thereto by bolts 46 connecting through the slots 44. The closure shell may continue down to form one half of the socket as in the normal construction, or may be terminated thereabove, permitting the otherwise unrestrained cushioning element to show through beneath, but held in operative position by the grip of the strip elements as in the previous construction. It is preferred that the adjustability feature be utilized for relatively small adjustments, so as to allow for the variations in door width incidental to planing the door for proper fit. It is to be noted that the lateral edges of the housing shell, as at 47 are formed so as to be complementary of the adjacent ornamental lines 35 so that the superficial aspect of the closure when attached is of ornamental design for the unitary structure.

The economy, simplicity, and efficiency of the device are thought to be evident. That many features of the invention are susceptible to modification and change without departing from the spirit of the invention is also deemed obvious.

I claim as my invention:

1. A threshold closure including a housing, a strip pivotally connected to the housing, said housing and said strip being so arranged as to permit of substantially identical variations in effective lengths to accord with variations in width of doors to be treated.

2. A threshold closure including a housing comprised of a plurality of relatively adjustable elements, a strip pivotally connected to the housing and comprised of a plurality of relatively adjustable elements, the housing arranged for attachment to a door, and the elements of the housing and strip respectively being adjustable to vary the effective length of the whole to accord with variations in widths of doors to be treated.

3. A threshold closure including a housing formed of a bent piece of material having two portions in substantial parallelism spaced to form an opening, a closure strip extending into the opening, means for pivoting the strip below its upper edge in the housing so arranged that as the strip is moved on its pivotal means the portion above the pivot is caused to move toward the outer of said two portions to effect a substantially tight joint therewith.

4. A threshold closure comprising a strip of metal having a pocket in its lower edge terminating in a restricted slot, a resilient cushion removably held in the pocket and having portions engaged by the edges of the restricted slot, means for operatively associating the strip with a door, and means for pivotally moving the strip relative the door.

5. A threshold closure including means for operatively associating the closure in pivoted relation to a door, a flexible clip extending laterally of the closure in position to abut the normal stop for the door, means connecting the clip to the closure toward one end thereof but inwardly spaced from the end thereof, whereby under pressure from impingement of the clip on the door stop said clip may flex in swinging the closure and impart resilient anti-rattling pressure to such door.

6. A threshold closure including a housing support, said support including a backing strip for attachment to a door, an overhanging guard strip connected to the backing strip, the backing strip having a tongue, a closure strip having a portion disposed between the backing strip and the guard and provided with a slot into which the tongue extends, with means for positioning the strip relative the tongue and relative the overhanging guard.

7. In a threshold closure a strip of pressed metal terminating at its lower edge in a curved edge, a complemental metallic strip affixed thereto and terminating in an oppositely curved edge, the said curved edges being spaced to form a slot communicating with a pocket delineated by the curved edges, a cushion strip mounted in the pocket extending in substantial alignment with the main body of the strip, and means for pivotally supporting the strip first mentioned.

8. A threshold closure comprising an elongated strip, means for operatively associating the strip in pivoted relation to a door, spring means for urging the strip to swing upwardly on its pivot, means operable to swing the strip downwardly on its pivot, the spring means and said last mentioned means operable at substantially identical points on the strip, thus precluding any appreciable warping of the strip in operation.

9. A threshold closure comprising a support housing, a strip pivoted to the housing at a plurality of points, a spring energizing the strip relative the housing toward one end thereof, a laterally projecting clip carried by the strip and mounted in such position that pressure thereon is directly opposed by the spring to prevent warping of the strip.

10. A threshold closure including a support housing having a backing strip, a closure strip pivotally disposed relative to the backing strip, a lug or clip for energizing the strip comprised of a portion engaging the strip and an offset ear extending laterally of the strip, the ear of the clip so arranged as to lie substantially in the plane of the backing strip in the operative position of the strip.

11. A pivoted threshold closure arranged for association with a door including a strip having a rear face partially spaced from the plane of such door, a plate connected to the spaced portion of the strip and terminating in a laterally extending lug or ear offset and spaced from said portion toward said door, whereby the strip is maintained in operative position relative the door with the ear of the plate in contact with the normal stop of such door.

12. A threshold closure including a strip of metal having connecting means toward each end, a door stop engaging clip arranged to project laterally from the strip and interchangeably positionable on either end of the strip by utilizing the appropriate connecting means therefore.

13. A threshold closure including a strip of metal having an opening toward each end, means for operatively associating the strip in pivoted relation to a door, a raising spring and a depressing clip arranged for coincident association with the strip at either end thereof by connections engaging the appropriate opening.

14. A longitudinally adjustable threshold closure comprising a pair of aligned supporting housings arranged for engagement with a door with a variable space between the adjacent ends, a pair of strips aligned and pivotally connected to the respective supporting housings arranged for maintenance in variably spaced relation, a shell housing mounted on the housings covering the gap between them, and a shell strip arranged to overlie the adjacent ends of the pair of pivoted strips, with means for holding the pivoted and shell strips together in adjusted relation.

15. A threshold closure including telescopically mounted shell and support housings, pivotally mounted closure strips carried by the housings, a shell closure strip having ornamentally curved edges overlying the ends of the closure strips, means for adjustably connecting the overlying shell strip to the pivoted strips, said strips being formed with lines complementary to the edges of the shell for imparting a balanced design impression of a unitary structure.

In testimony whereof I affix my signature.

MAURICE C. ROSENBLATT.